L. G. Marshall,
Expanding Rock Drill.
Nº 40,176. Patented Oct. 6, 1863.
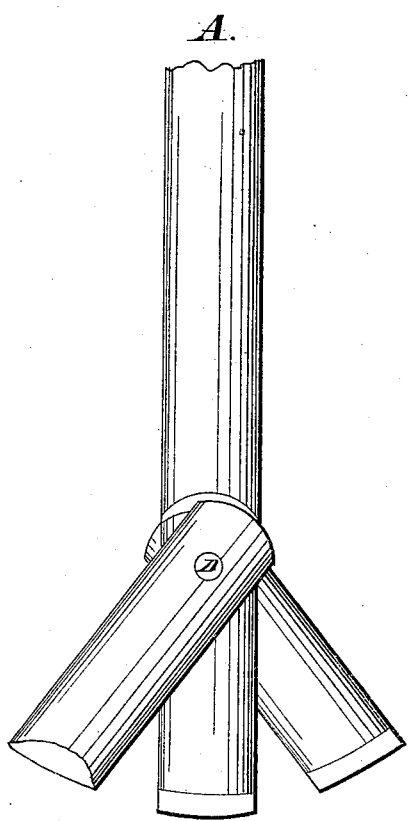

UNITED STATES PATENT OFFICE.

LOOMIS G. MARSHALL, OF PHILADELPHIA, PENNSYLVANIA.

IMPROVED ROCK-DRILL.

Specification forming part of Letters Patent No. 40,176, dated October 6, 1863.

*To all whom it may concern:*

Be it known that I, LOOMIS G. MARSHALL, of the city of Philadelphia, in the State of Pennsylvania, have invented a new and useful Improvement for Drilling and Excavating Rock, Ore, and Coal of all Kinds, called "Marshall Rock-Drilling Excavator."

I claim a new model or form of excavator for enlarging the bottom of the hole when drilled into the rock, so to compact the powder more into a flat position at the bottom, so as to give more surface of pressure when exploded, so as to produce ten times the effect of an ordinary drill. This drill is composed of three parts—first, the main bar or body, the full length required for drilling holes of all sizes, and at the lower end of the drill is a slit on both sides of the drill, so as to leave about one-third divided into the center, leaving room on each side for a joint or wing-drill fitting close in a socket shoulder-joint, so as to separate the side drills. The side or wing drills are hung by a rivet through the center blade of the main or middle drill and the two opposite corners of the outside drills or blades. These corners referred to are left a little longer than the two inside corners. The two outside corners, being the longest, will cause the two wings to spread as the drill goes down. When the two outside drills or wings are spread, so that it would leave a cone in the center, then the middle blade or drill commences to take out the center. These three drills or blades completely remove all the rock, leaving the bottom of the hole nearly flat, thus making the excavation three times as large as any regular drill can do. I claim the right to vary the blades or wings in length from two to twenty inches or more in length. I claim all sizes of drills to suit all kinds of rock in all places wherever used. These drills are sharpened and made out of the best steel.

The drawings forming part of these specifications show the means for carrying out my invention. Letter A is a face or front view, showing the wings or blades extended. Letter B is a side view, showing the three pieces forming the main drill with wings. Letter C represents the solid drill closed up complete. Letter D represents the rivet, fixing all the blades or wings together.

What I claim as my invention, and desire to secure by Letters Patent, is—

The arrangement of the drill itself, with the blades or wings to expand, making the excavation at the bottom to hold a large quantity of powder.

LOOMIS G. MARSHALL.

Witnesses:
    W. W. DOUGHERTY,
    EZRA HAND.